United States Patent [19]

Diaz

[11] Patent Number: 4,635,334
[45] Date of Patent: Jan. 13, 1987

[54] AUTOMATIC TRANSMISSION REBUILDING TOOL

[76] Inventor: Eusebio M. Diaz, 6450 Balboa Blvd., Van Nuys, Calif. 91406

[21] Appl. No.: 793,317

[22] Filed: Oct. 31, 1985

[51] Int. Cl.4 .......................................... B23P 19/04
[52] U.S. Cl. ...................................... 29/226; 29/251; 269/11
[58] Field of Search .................... 29/226, 227, 251; 254/10.5; 100/231, 289; 269/11

[56] References Cited

U.S. PATENT DOCUMENTS

| | | | |
|---|---|---|---|
| 193,330 | 7/1877 | Hall et al. | 100/289 X |
| 2,336,262 | 12/1943 | Krasberg | 29/251 |
| 3,078,556 | 2/1963 | Carroll | 29/226 |
| 3,099,875 | 8/1963 | Lelis | 254/10.5 X |
| 3,100,438 | 8/1963 | Merker | 29/251 X |
| 3,115,699 | 12/1963 | Nakahira | 29/226 |
| 3,871,055 | 3/1975 | Dail | 29/226 X |
| 4,395,020 | 7/1983 | Spainhour | 29/227 X |
| 4,494,289 | 1/1985 | Matsuura | 254/10.5 X |

Primary Examiner—Frederick R. Schmidt
Assistant Examiner—Steven P. Schad
Attorney, Agent, or Firm—Albert O. Cota

[57] ABSTRACT

A rebuilding tool for an automatic transmission which has a table top mountable base (20) with front (22) and rear (24) legs upwardly extending, and a working platform (28) in between. An adjustable height extension member (34) is slideably connected within the rear leg (24) and contains cavities (36) on the sides to receive either a horizontal beam (46) or an offset beam (48) that extend above the platform (28). The extension member (34) is adjustable in height positioning the beam at the desired location with a selected one of a series of jigs (50), or fixtures (52) and (54), adjustably disposed on the end of the beam. This jig (50), or fixture, holds the workpiece in compression against the platform (28) and is individually adjustable by threaded rod compressing means (60) having a manually operated handle. The beam (46) or (48) that is not in use is stored in the remaining cavity (36) on the extension member (34). Any combination of beam, jig, or fixture, may be utilized to correspond with the particular automatic transmission being rebuilt.

11 Claims, 12 Drawing Figures

AUTOMATIC TRANSMISSION REBUILDING TOOL

TECHNICAL FIELD

The present invention generally pertains to assembly and disassembly tools and more specifically to an automatic transmission clutch drum spring compressing tool that facilitates the removal of the rear piston from the transmission case and the pistons from the transmission drum.

BACKGROUND ART

Previously, many types of tools have been used endeavoring to assist the mechanic in rebuilding an automatic transmission. Specific hand tools are in common use for a given application, with many available from the original automobile manufacturer or transmission manufacturer. Simple hand tools have also been utilized, however, many assemblies within an automatic transmission utilize springs that are compressed simultaneously while retained with snap rings, making this procedure tedious and difficult. A search of prior art did not disclose any patents that read directly on the claims of the instant invention, however, the following U.S. patents were considered related:

| U.S. Pat No. | Inventor | Issue Date |
| --- | --- | --- |
| 4,494,289 | Matsuura | Jan. 22, 1985 |
| 3,871,055 | Dail | Mar. 18, 1975 |
| 3,099,875 | Lelis | Aug. 6, 1963 |

Matsuura teaches a tool specifically adapted for subassembly of automobile front or rear suspension systems, known as the MacPherson type having a strut formed by a lower tube. The strut includes a built-in shock absorber with part of a piston projecting upward from the strut. A coil spring is mounted compressibly around the strut with the subassembly combined separately as a unit, then mounted into the vehicle. The power to compress the coil spring is furnished by a reversable electric motor connected to a drive pulley through an electromagnetic clutch. A clamping mechanism having push-down fingers are adjustably connected to the corresponding compressor arms so as to allow independent adjustment of the fingers to assure complete contact with the spring. The device is mounted on a base that sits on the floor with drive belts connected to pulleys and a threaded shaft providing the linear thrust for the spring compression.

Dail utilizes a foot actuated press to engage a pressable portion of the seal assembly, or a pump, in an automatic transmission during major repairs or an overhaul. An object of Dails invention is to provide a foot actuated press that enables the operator to initiate the pressing operation against a workpiece by using only one of his feet, leaving his hands free to do other work about the workpiece. This single tool provides the capabilities of breaking down and reassembling a conventional automatic transmission clutch assembly, an integral clutch assembly, and an automatic transmission clutch assembly having a drive shaft associated therewith and extending therefrom. This invention is designed to be located on the floor of a service or shop area. The workpiece engager of the invention consists of a U-shaped structure assuming an inadverted position against a transverse base having a central opening therein. A series of workpiece engagers are employed, each having a particular distance between the legs to accommodate various workpieces.

Lelis employs a stand having a table on a frame with a rod disposed through the table with a foot lever underneath to raise and lower the actuating rod. A flanged work member is supplied on the rod above the table to accommodate varying heights of equipment to be assembled. A plurality of plates are provided for the various workpieces and centering tools, adapters and work members are included for assembling many types of automotive units. The foot lever is extendable and exhibits a detent action so as to permit the application, through a lever and link system, of at least two different operating forces applying a mechanical advantage to the actuating rod.

It will be noted that prior art is aware of the problem of spring compression in overhauling automotive transmissions and has attempted to obtain a solution by the utilization of large pedestal mounted devices, some using foot levers, others electrical motors, for clamping action required with spring loaded subassemblies.

DISCLOSURE OF THE INVENTION

While prior art has looked toward a permanent, or stand mounted, press that is adaptable for use with an automatic transmission a number of areas still have the need for a device that is less costly, simpler, and portable, with the capabilities of being mounted on a bench or set on the floor and adaptable for repairing most domestic and foreign transmissions. The instant invention contains such advantages and features as the primary object of the invention is the ability of the device to function with all automatic transmission drums containing return springs. Further, the apparatus will remove and reassemble the rear piston of a transmission case and the pistons from the transmission drum. The inventive tool is equipped with the necessary jigs and fixtures to overhaul the automatic transmission used on vehicles manufactured by most American and foreign companies. Such companies include General Motors, Ford, Chrysler and American etc. as well as Mercedes, BMW, Volkswagen, Nissan, Toyota and Mazda etc.

An important object of the invention is its portability inasmuch as it is small and lightweight enough to be used on an existing table or workbench, not requiring additional floor space or permanent attachment to the floor. It may also be stored in another location when not in use with all of the adapters and jigs attached so as to keep all of the equipment together when not in use.

Another object of the invention relates to the ease of operation. As there are two separate arms, it is apparent which one is required when compressing from either the top or the bottom, and the size of the adapters is obvious to one skilled in the art. As the compressive force is applied by turning a threaded rod the assembly is held secure allowing both hands to be free to attach the snap ring or even leave the assembly to get another part or hand tool.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
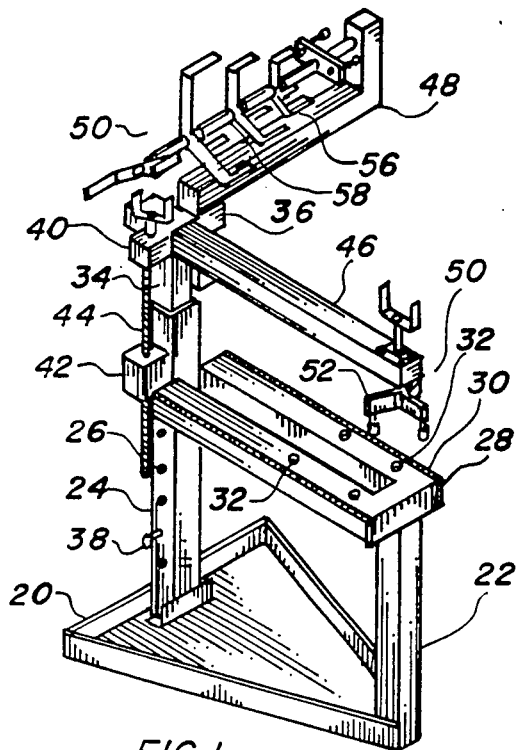
FIG. 1 is a partial isometric view of the preferred embodiment.
Figure 2:
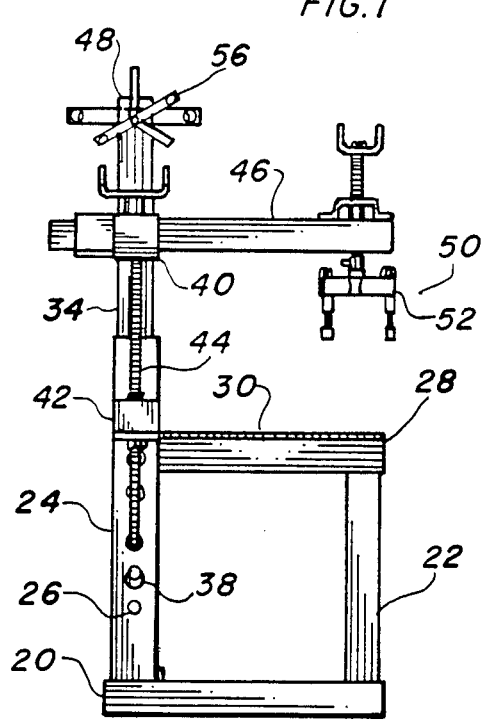
FIG. 2 is a side view of the preferred embodiment with the horizontal beam in the working position.
Figure 3:
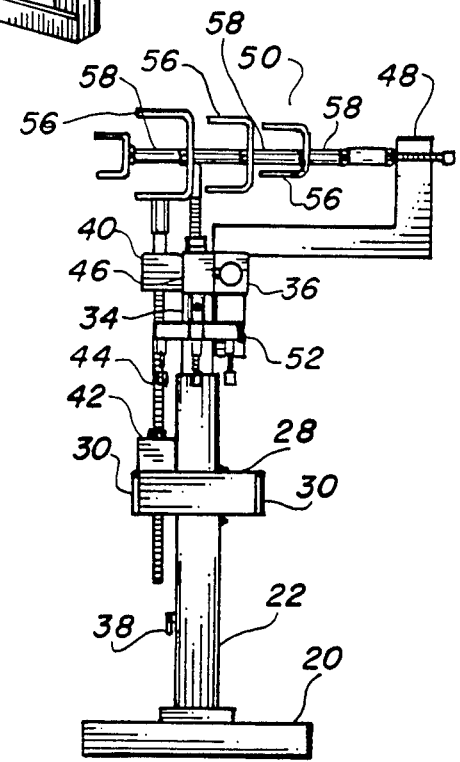
FIG. 3 is a front view of the preferred embodiment with the horizontal beam in the working position.
Figure 4:
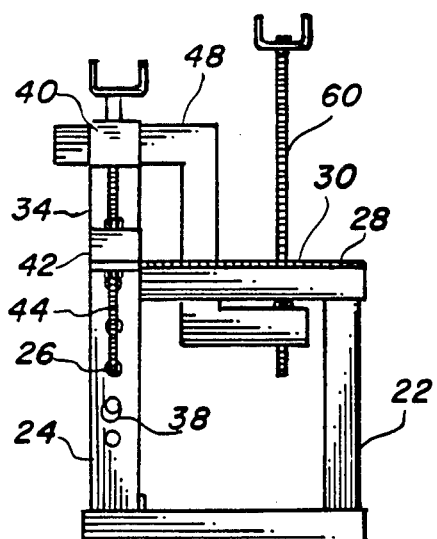
FIG. 4 is a side view of the preferred embodiment with the offset beam below the worktable.
Figure 5:
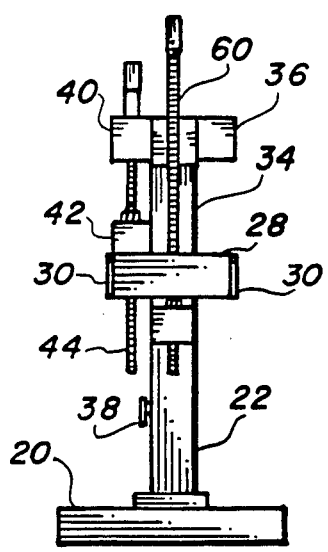
FIG. 5 is a front view of the preferred embodiment with the offset beam below the worktable.
Figure 6:
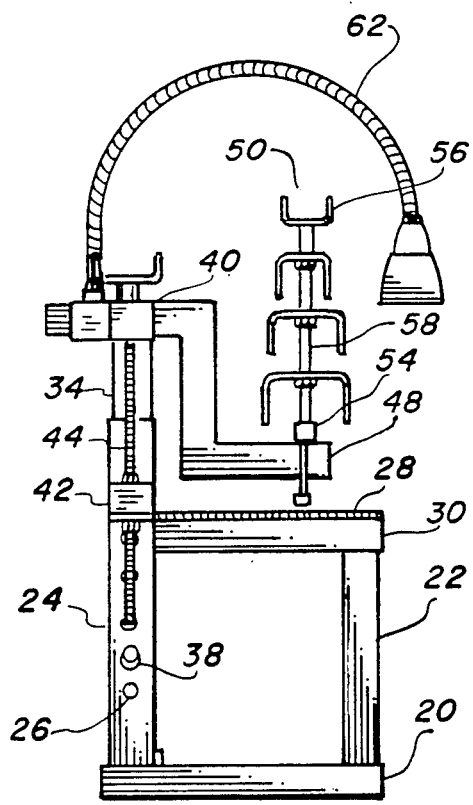
FIG. 6 is a side view of the preferred embodiment with the offset beam in the upper working position.
Figure 7:
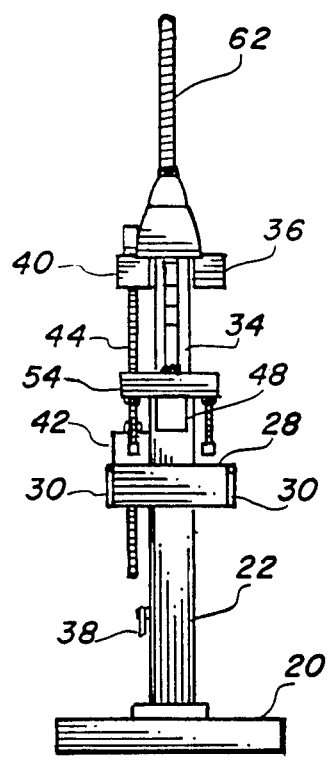
FIG. 7 is a front view of the preferred embodiment with the offset beam in the upper working position.
Figure 8:
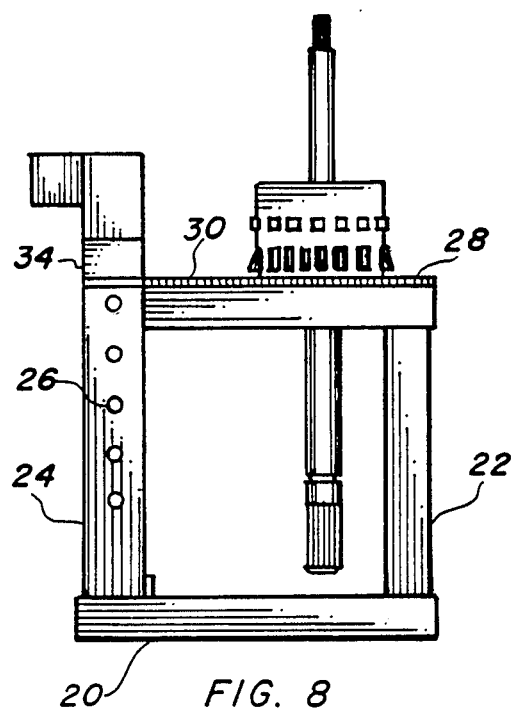
FIG. 8 is a side view of the preferred embodiment with the beams removed and a workpiece with a shaft on the worktable.
Figure 9:
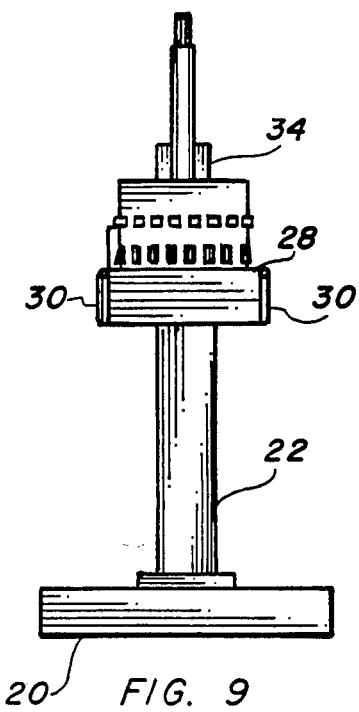
FIG. 9 is a front view of the preferred embodiment with the beams removed and a workpiece with a shaft on the worktable.
Figure 10:
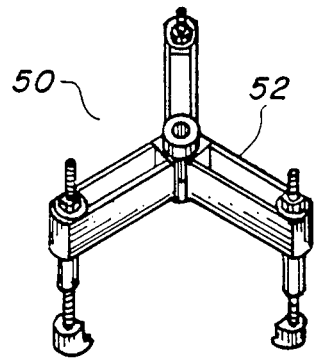
FIG. 10 is a partial isometric view of the 3—fingered fingered fixture completely removed from the invention for clarity.
Figure 11:
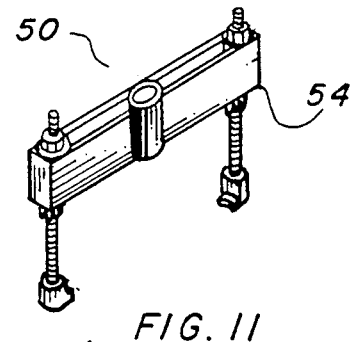
FIG. 11 is a partial isometric view of the 2—fingered fingered fixture completely removed from the invention for clarity.
Figure 12:
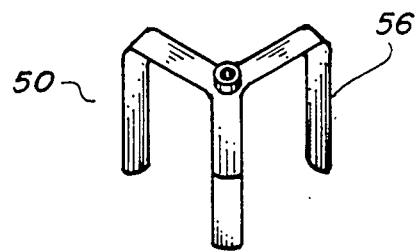
FIG. 12 is a partial isometric view of the multileg clamp completely removed from the invention for clarity.

The best mode for carrying out the invention is presented in terms of a preferred embodiment. This preferred embodiment, as shown in FIGS. 1 through 12 is comprised of a triangular shaped base 20 having a flat major bottom surface and flanges on the periphery that are formed upward into a pan-like structure. This base 20 is constructed of sheetmetal, preferably cold or hot rolled steel and the corners are welded together to form an integral unit. This base 20 has sufficient surface underneath to create a suitable platform for holding the tool in a stable position while mounted on a workbench or table. A front leg 22 is welded into one of the corners and projects upward from the base 20 at a right angle. The leg 22 is contiguous with the base flanges and the end is flush with the bottom surface of the base 20 and is made of square, rectangular, or round tubing, or may be sheetmetal, formed into a structured shape.

A rear tubular leg 24 is positioned in like manner in alignment with the front leg midway between the remaining corners of the base 20. This leg 24 is also contiguous with the flanges and welded in place. The height of the leg 24 is slightly greater than that of the front leg 22 and the tubular member is hollow on the inside surface. A plurality of holes 26 are positioned through both sides of the leg 24 in spaced relationship for adjustment purposes of a member disposed therein. A working platform 28 is connected between the front leg 22 and rear leg 24 and is parallel with the base 20. This platform 28 is constructed with a pair of structural angles, one on each side of the legs 22 and 24, with the downwardly depending angle legs attached thereunto, and the angle outwardly extending legs forming a parallel flat table-like surface with a slot in between. A third angle is added to the platform 28 directly above the front leg 22 also with the angle legs horizontal and downwardly depending completing the platform surface. These angles have sufficient structural integrity to maintain a thrust load between the span of the legs when compressing the internal springs and components within the transmission subassemblies. A pair of outwardly depending continuous hinged panels 30 may be added to the horizontal flanges of the platform 28, further extending the flat surface on the top. When the leaf is extended, the top surface is increased by 30 percent, and when in its normal position hanging downward, as shown in FIGS. 1-9, the leaf is completely out of the way as the knuckle section becomes the outward edge of the platform 28. The increased working area added to the working platform 28, when the hinged panels 30 are in a platform-parallel position, is particularly useful in assembly procedures where additional side room is required to facilitate assembly.

Each of the hinged leaves 30 may also be placed in their upward position to form a walled area to contain parts of smaller assemblies. A leaf holding means (not shown) maintains the leaves in their upward position. A plurality of bores 32 in the top surface of the platform are positioned to accommodate particular clutch subassemblies of the workpiece.

An adjustable height extension member 34 having an arm retaining socket on the end is slideably positioned within the rear tubular leg 24 and extends upwardly therefrom. The member 34 is slightly smaller on the outside than the inside of the leg 24 allowing a slip fit between while still providing a structural interface. This member 34 effectively increases the height of the rear leg 24 upwardly from the platform 28 so as to accommodate various combinations of dissembled elements of a transmission increasing the flexibility of the tool. The manual adjustment of height of this member 34 is provided by one of two methods, or a combination thereof. First, a plurality of cavities 35 are located in the member itself that match the holes 26 in the leg 24 through which a pin 38 is positioned. This provides an incremental adjustment by the removal of the pin 38 and repositioning therethrough in another set of holes 26 and cavities 35. This allows an adjustment at a predetermined spacing and is quick, strong, and easy to operate. The second height adjusting means utilizes a threaded boss 40 integral with the extension member 34 protruding from one of the sides with the threads vertically parallel thereunto and a threaded sleeve 42 abutted to the rear leg 24 in alignment with the boss 40. A threaded rod 44 with a handle on one end is in rotational communication with the boss 40 and sleeve 42 allowing a clamping action to take place therebetween when the handle of the rod 44 is rotated. This action brings the elements together or separates them according to the rotational direction of the rod 44. In combination, the rod is rotated until alignment is achieved through a set of holes 26 and cavities 35 allowing the pin 38 to be inserted securing the adjustment.

A pair of cantilevered arms are utilized in the invention with one or the other slideably affixed through the socket in the height extension member 34 and extend parallel to the working platform 28. One of these arms is a horizontal beam 46 and extends above the platform 28. The beam 46 may slide within the socket forward and aft to allow the end to be positioned at the optimum location in relation to the platform 28. On the end of the beam 46 there are provisions to attach jigs and fixtures consisting of a threaded aperture therethrough in the form of a sleeve, a raised hat shaped bracket having a hexagonal shaped nut welded thereunder, or the like. As the extension member 34 allows height adjustment and the socket on the top provides the horizontal displacement, the beam 46 may be located in almost any position in relation to the platform 28, provided the alignment is the same in the center. This flexibility allows the tool to accept many and varied types of subassemblies from a variety of automatic transmissions without changing arms or assembly procedures.

The other cantilevered arm consists of an offset beam 48, much like the above, except instead of being straight, it is formed in a Z-shape with all 90 degree right angles on the bends. This offset beam 48 serves the same function as the horizontal beam 46, except instead of being above the platform 28, it is positioned adjacently or below allowing a reversed compression procedure for the tool. Only one of the beams 46 or 48 is mounted into a horizontal socket on the top of the extension member 34 while in use and the other is stored in a similar socket adjacent thereunto, except in a vertical position. This allows the tool to stay together at all times so as to not lose or displace the removable components.

A holding jig assembly 50 is adjustably disposed on the end of each beam 46 and 48 opposite the interface of the arm retaining socket in the extension member 34 for engaging and holding individual transmission components and subassemblies. These jig assemblies 50 are varied in size and shape for the particular application, however, they fall into three basic forms. The first is a three-fingered fixture 52 having a spring retaining holder on the end of each projecting finger. These holders have a threaded shank that penetrates the fixture 52 and allows a height adjustment from the end and contains an extended holder allowing flat plates, such as retainers, disc hubs, washers, and the like, to be gripped and held into place by the jig. The second jig is much like the first, except contains only a pair of holders. This two-fingered fixture 54 is in the shape of a horizontal bar with the holders and threaded shank projecting downwardly in parallel relationship. In application the second jig works indentically, except with the use of two fingers only. The third basic type of jig in use is comprised of a multi-leg clamp 56 with a plurality of downwardly depending members. The number of legs may vary, but three is preferred. These camps 56 also contain a threaded hub in the center for compression adjustment and are shown individually in FIG. 12 and nested together on the offset beam 48 in FIGS. 1 through 3. A number of spacer sleeves 58 are used in conjunction with the jigs 52, 54, and 56, and allow complete flexibility of the distance from the cantilevered arms 46 and 48. These spacer sleeves 58 may be used singly or in multiples as required by the application.

The above jigs are compressed between the beams 46 and 48 and the platform 28 by compressing means consisting of a threaded rod 60 with a handle on one end. This rod 60 interfaces between the above arms and platform in a rotatable manner. When the handle of this rod 60 is manually revolved matching threads in the end of the beam 46 or 48 are engaged placing the jig 52, 54, or 56 in a compressible union with the stationary platform 28. Any combination of jigs and spacers 58 may be utilized to fit the particular application.

A flexible arm lamp 62 may be mounted upon the top of the extension member 34 in order to provide illumination to the workpiece components and subassemblies. This lamp 62 is not necessary for the invention, however, as an accessory some utility is provided in applications where the lighting is less than optimum.

In operation the mechanic is able to dissemble most of the automatic transmission with conventional hand tools, however, some subassemblies such as the reverse clutch piston in the rear of the transmission case and the forward clutch piston require the use of this rebuilding tool to complete the task. In reassembling the transmission, the subassemblies that contain springs are placed on the platform 28 and the proper beam 46 or 48 is selected according to the type of transmission being overhauled. The jig 50 is then selected from the array that is available, as all are interchangeable from either arm with the diameter, depth, etc., individually apparent from the size of the workpiece. The height of the beam 46 or 48 is adjusted by either the pin 38 or the handle on the threaded rod 44 and the individual jig is tensioned against the platform 28 by the threaded rod compressing means 60 containing a operating handle on the top. Spacer sleeves 58 are also used in combination with the selected jig, as required.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the claims.

I claim:

1. A universal automatic transmission rebuilding tool for dissembly and assembly of transmission components comprising:

(a) a triangular shaped base having a flat major bottom surface with upstanding flanges on the periphery thereof;

(b) a front leg distending upward from said base at one of the corners contiguous with said flanges;

(c) a rear tubular leg, slightly longer than said front leg, upstandingly positioned in alignment with the front leg midway between the remaining corners of said triangular shaped base, and contiguous with said flange;

(d) a working platform connected between said front leg and rear leg spacingly juxtapositioned with said base providing a surface to receive various components of said automatic transmission during rebuilding procedures;

(e) an adjustable height extension member having arm retaining sockets on the end slidingly embracing the inside surface of said rear tubular leg, disposed upwardly therefrom effectively increasing the height of said rear leg from said platform to the retaining sockets to accommodate various combinations of dissembled elements of said transmission;

(f) height adjusting means attached between said extension member and said rear leg providing variable movement of the extension member within the rear leg by manual manipulation therewith;

(g) a plurality of differently sized cantilevered arms slidingly affixed through said arm retaining sockets and alternatively positioned for operation on the transmission components;

(h) a holding jig assembly adjustably disposed on each cantilevered arm at the end opposite the interface of the arm retaining socket for graspingly engaging and holding individual transmission components; and, (i) jig compressing means drivingly connected between each cantilevered arm and each holding jig providing the necessary force to hold the transmission components in a constrained position between the arm and said working platform while in the assembly procedure during the rebuilding process of an automatic transmission.

2. The invention as recited in claim 1 wherein said working platform further comprises: a pair of hinged panels on the sides opposite the interface with said front and rear leg where said panels effectively increase or modify the working area of said platform.

3. The invention as recited in claim 1 wherein said height adjusting means further comprises: a pin disposed through said rear leg and said height extension member insuch a manner as to provide incremental adjustment by the removal of the pin and the repositioning therethrough at another location.

4. The invention as recited in claim 1 wherein said height adjusting means further comprises: a threaded boss integral with said extension member located in a vertical position parallel thereunto, a threaded sleeve abutted to said rear leg in alignment with said boss, and a threaded rod having a handle on one end in rotational communication with said boss and sleeve defining a clamping action therebetween when the handle is rotated bringing the elements together or separating by the rotational direction of the handle.

5. The invention as recited in claim 1 wherein at least one of said cantilevered arms comprises: a horizontal beam positioned through one of the arm retaining sockets in such a manner as to be parallel with said working platform providing a linear extension for holding said jig assembly in juxtaposed relationship thereunto.

6. The invention as recited in claim 1 wherein at least one of said cantilevered arms comprises: an offset beam positioned through one of the arm retaining sockets in such a manner as to be offsettingly parallel with said working platform providing a linear extension for holding said jig assembly in a position below said working platform applying a force from underneath in a reverse clamping fashion.

7. The invention as recited in claim 1 wherein said holding jig further comprises: a three-fingered fixture having a spring retaining holder on the end of each projecting finger for holding specific transmission components thereupon.

8. The invention as recited in claim 1 wherein said holding jig further comprises: a two-fingered fixture having a spring retaining holder on the end of each projecting finger for holding specific transmission components thereupon.

9. The invention as recited in claim 1 wherein said holding jig further comprises: a multi-leg clamp with a plurality of downwardly depending members for holding specific transmission components thereupon.

10. The invention as recited in claim 1 further comprising: jig compressing means having a threaded rod with a handle on one end, interfacing between said holding jigs and said cantilevered arms providing a compressible adjustment therebetween.

11. The invention as recited in claim 1 further comprising: a flexible arm lamp mounted upon the top of said extension member to provide illumination to the transmission components during the rebuilding process.

* * * * *